(12) United States Patent
Mandal et al.

(10) Patent No.: US 11,336,502 B2
(45) Date of Patent: May 17, 2022

(54) DERIVING NETWORK DEVICE AND HOST CONNECTION

(71) Applicant: Juniper Networks, Inc., Sunnyvale, CA (US)

(72) Inventors: Biswajit Mandal, Santa Clara, CA (US); Anita Kar, Santa Clara, CA (US); Harshit Naresh Chitalia, Mountain View, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/922,582

(22) Filed: Jul. 7, 2020

(65) Prior Publication Data

US 2022/0014415 A1 Jan. 13, 2022

(51) Int. Cl.
*G06F 13/00* (2006.01)
*H04L 41/0213* (2022.01)
*H04L 101/622* (2022.01)
*H04L 41/14* (2022.01)
*H04L 41/12* (2022.01)

(52) U.S. Cl.
CPC .......... *H04L 41/0213* (2013.01); *H04L 41/12* (2013.01); *H04L 41/14* (2013.01); *H04L 61/6022* (2013.01)

(58) Field of Classification Search
CPC . H04L 41/0213; H04L 61/6022; H04L 41/14; H04L 41/12
USPC .......................... 709/249, 250, 245, 224, 230
See application file for complete search history.

(56) References Cited

U.S. PATENT DOCUMENTS

| 7,394,773 | B2 * | 7/2008 | Brooks | H04L 43/50 370/241 |
| 7,739,402 | B2 * | 6/2010 | Roese | H04L 63/10 709/242 |
| 8,369,227 | B2 * | 2/2013 | Morimura | G06F 11/0727 370/242 |
| 8,543,681 | B2 * | 9/2013 | Bearden | H04M 7/006 709/224 |

(Continued)

OTHER PUBLICATIONS

Norseth et al., "Definitions of Managed Objects for Bridges," Network Working Group, RFC 4188, Sep. 2005, 45 pp.

(Continued)

*Primary Examiner* — Kenneth R Coulter
(74) *Attorney, Agent, or Firm* — Shumaker & Sieffert, P.A.

(57) ABSTRACT

This disclosure describes techniques that determine device connectivity in the absence of a network layer 2 discovery protocol such as Link Layer Discovery Protocol (LLDP). In one example, this disclosure describes a method that includes retrieving, from a bridge data store of a bridge device on a network having one or more host devices, a plurality of first interface indexes, wherein each first interface index corresponds to a network interface of network interfaces of the bridge device; retrieving, from the bridge data store, remote network addresses corresponding to the network interfaces of the bridge device, each remote network address of the remote network addresses corresponding to a second interface index; selecting a remote network address having a second interface index that matches the first interface index; determining a host device having the selected remote network address; and outputting an indication that the bridge device is coupled to the host device.

20 Claims, 7 Drawing Sheets

(56) References Cited

U.S. PATENT DOCUMENTS

| | | | | |
|---|---|---|---|---|
| 8,868,715 | B2* | 10/2014 | Bearden | H04L 41/12 |
| | | | | 709/224 |
| 9,077,558 | B2* | 7/2015 | Levy | H04L 12/4625 |
| 9,276,817 | B2* | 3/2016 | Senthilkumar | H04L 41/12 |
| 10,855,733 | B2* | 12/2020 | Mittal | H04L 65/4076 |
| 2003/0086425 | A1* | 5/2003 | Bearden | H04M 3/2236 |
| | | | | 370/392 |
| 2003/0097438 | A1* | 5/2003 | Bearden | H04L 41/12 |
| | | | | 709/224 |
| 2003/0225893 | A1* | 12/2003 | Roese | H04L 69/329 |
| | | | | 709/227 |
| 2005/0089051 | A1* | 4/2005 | Brooks | H04L 43/50 |
| | | | | 370/401 |
| 2010/0220701 | A1* | 9/2010 | Levy | H04L 12/4625 |
| | | | | 370/338 |
| 2011/0265006 | A1* | 10/2011 | Morimura | G06F 11/079 |
| | | | | 715/736 |
| 2015/0019712 | A1* | 1/2015 | Senthilkumar | H04L 41/12 |
| | | | | 709/224 |
| 2016/0330080 | A1 | 11/2016 | Bhatia et al. | |
| 2019/0386876 | A1 | 12/2019 | Sridhar et al. | |
| 2020/0007403 | A1 | 1/2020 | Rao et al. | |
| 2020/0177654 | A1* | 6/2020 | Mittal | H04L 61/6022 |

OTHER PUBLICATIONS

Levi et al., "Definitions of Managed Objects for Bridges with Traffic Classes, Multicast Filtering, and Virtual LAN Extensions," Network Working Group, RFC 4363, Jan. 2006, 100 pp.
Extended Search Report from counterpart European Application No. 20199034.8, dated Mar. 11, 2021, 8 pp.

* cited by examiner

```
import glob
import commands def get_all_physical_interface_names(SYS_PATH="/sys", index=4):
    physical_interfaces = []
    try:
        output = glob.glob(SYS_PATH + "/class/net/*/device")
    except Exception as e:
        return physical_interfaces for dev in output:
        try:
            words = dev.split('/')
            physical_interfaces.append(words[index])
        except Exception as e:
            continue return physical_interfaces def get_all_physical_interfaces_mac_address(SYS_PATH="/sys",
                                           index=4):
    physical_interfaces = get_all_physical_interface_names(SYS_PATH, index)
    result = []
    for interface in physical_interfaces:
        cmd = "cat " + SYS_PATH + "/class/net/" + interface + "/address"
        output = commands.getoutput(cmd)
        result.append({'InterfaceName': interface, 'MacAddress': output})
    return result print get_all_physical_interfaces_mac_address()
```

FIG. 6

DERIVING NETWORK DEVICE AND HOST CONNECTION

TECHNICAL FIELD

This disclosure relates to analysis of computer networks, including determining device connectivity in computer networks.

BACKGROUND

Virtualized data centers are becoming a core foundation of the modern information technology (IT) infrastructure. In particular, modern data centers have extensively utilized virtualized environments in which virtual hosts, such virtual machines or containers, are deployed and executed on an underlying compute platform of physical computing devices.

Virtualization within a large-scale data center can provide several advantages, including efficient use of computing resources and simplification of network configuration. Thus, enterprise IT staff often prefer virtualized compute clusters in data centers for their management advantages in addition to the efficiency and increased return on investment (ROI) that virtualization provides.

Supporting virtualization in large scale data center can require numerous network devices and host devices that can be coupled together in a data center network. Connectivity information indicating how host devices are connected to network devices can be useful in deploying, analyzing, and troubleshooting components within a data center.

SUMMARY

This disclosure describes techniques that include determining connectivity information for network devices when at least one of the network devices does not implement a layer 2 discovery protocol such as LLDP. As an example, the network devices may include bridge devices such as network switches, routers, gateways etc. and host devices such as servers, client devices etc. The bridge devices typically implement LLDP, while one or more of the host devices may not implement LLDP. A network analysis system may collect underlay and overlay flow information for network devices in the network. The connectivity information may facilitate analysis and presentation of information about physical network infrastructure. For example, the techniques may facilitate presentation of information about underlay flow data and network virtualization (e.g., overlay flow data), correlating the data to enable insights into network operation and performance. In some examples, a network analysis system may issue SNMP queries to obtain information from bridge devices such as switches, router, gateways etc. to determine various parameters for interfaces of the bridge device. The network analysis system may correlate the information to determine a remote Media Access Control (MAC) address of a host device coupled to the bridge device. The network analysis system may further correlate the remote physical address to an Internet Protocol (IP) address and/or host name.

The techniques described herein may provide one or more technical advantages. For example, the techniques may facilitate obtaining device connectivity data for devices that do not implement a layer 2 network protocol. Thus, the techniques may provide a more complete network topology, thereby facilitating improved network analysis and improved visualization of a network infrastructure.

In some examples, this disclosure describes operations performed by a network analysis system or other network system in accordance with one or more aspects of this disclosure. In one specific example, this disclosure describes a method comprising retrieving, by a network analysis system from a bridge data store of a bridge device on a network having one or more host devices, a plurality of first interface indexes, wherein each first interface index corresponds to a network interface of a plurality of network interfaces of the bridge device; retrieving, from the bridge data store, a plurality of remote physical addresses corresponding to the plurality of network interfaces of the bridge device, each remote physical address of the remote physical addresses corresponding to a second interface index; identifying a remote physical address corresponding to a second interface index that matches the first interface index; determining a host device having the selected remote physical address; and outputting an indication that the bridge device is communicatively coupled to the host device.

In another example, this disclosure describes a system including processing circuitry configured to perform operations described herein. In another example, this disclosure describes a non-transitory computer-readable storage medium comprises instructions that, when executed, configure processing circuitry of a computing system to perform operations described herein.

BRIEF DESCRIPTION OF THE DRAWINGS

FIG. 6 illustrates example program code for obtaining interface names and the corresponding MAC addresses of the interfaces of a host device.

DETAILED DESCRIPTION

Data centers that use virtualized environments in which virtual hosts, virtual machines, or containers are deployed and executed on an underlying compute platform of physical computing devices provide efficiency, cost, and organizational advantages. A typical data center employs numerous network devices and host devices that are used to support the virtualized environment and enable communication between entities both within the data center and external to the data center. Obtaining meaningful insights into application workloads may be essential in efficiently managing a data center fabric. Traffic samples from networking devices may help provide such insights.

In some cases, collecting sufficient data from network devices to facilitate network analysis can be a challenge, particularly when there is a lack of connectivity information for one or more network devices in a data center or other network environment. For example, one or more host devices might not implement or execute a network discovery protocol such as Link Layer Discover Protocol (LLDP), which would enable connectivity information to be discovered regarding the one or more host devices. In such cases, network analysis tools may lack the connectivity information to efficiently analyze network traffic flows and perform network trouble shooting. Further, the lack of connectivity information may prevent obtaining a complete visualization of a network. Techniques are described herein to enable determining connectivity information regardless of whether a host device implements a discovery protocol or not. In some examples, a user interface may be generated to enable accurate visualization of device connectivity in a network system, the data collected and how data flows through underlay and overlay networks. Accurate determination of device connectivity information can facilitate analysis and presentation of such data in a user interface that may provide insights into the network, and provide users, administrators, and/or other personnel with tools for network discovery, investigation, and troubleshooting.

Figure 1:
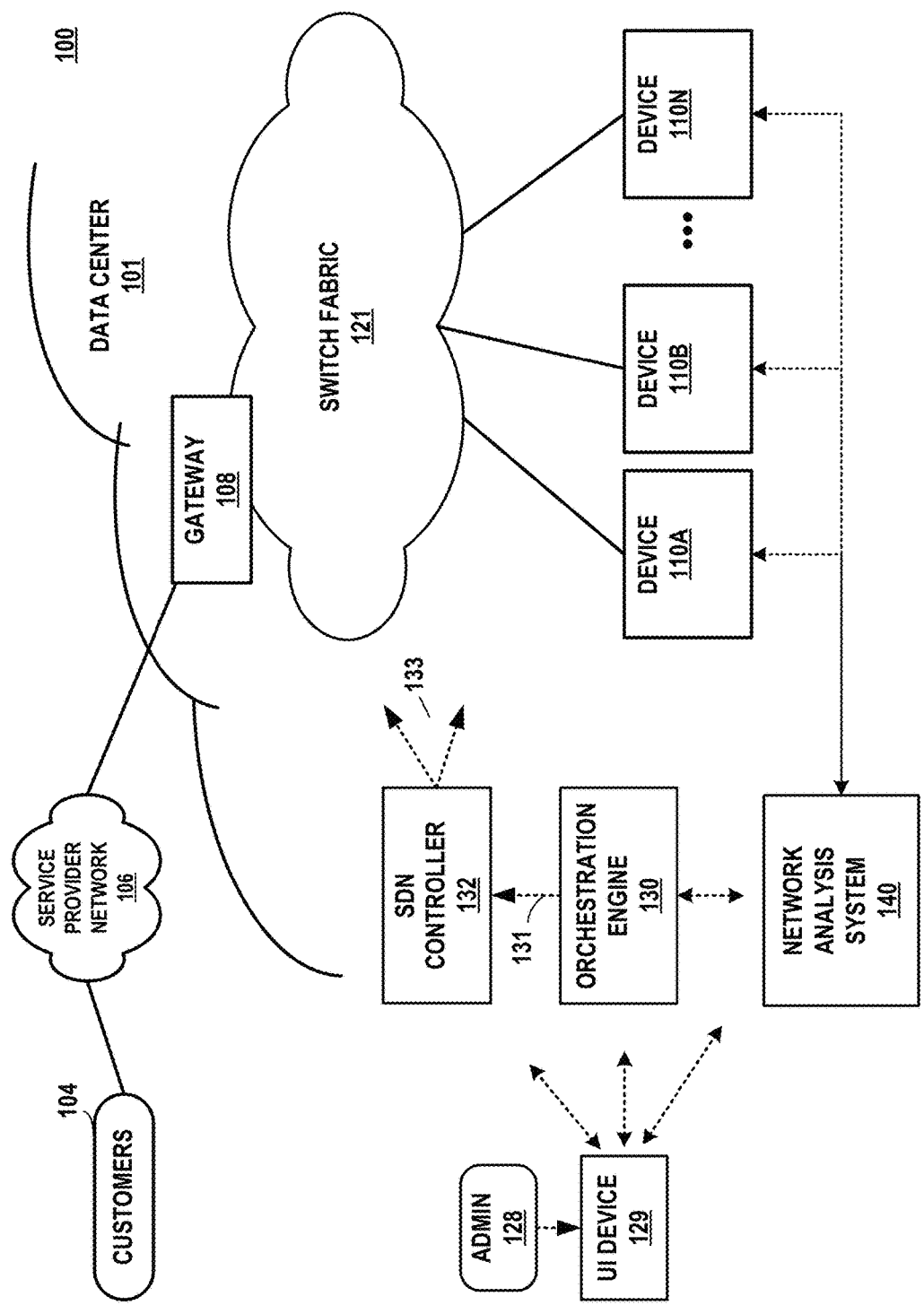
FIG. 1 is a conceptual diagram illustrating an example network that includes a system for analyzing device connectivity across a network and/or within data center, in accordance with one or more aspects of the present disclosure.

FIG. 1 is a conceptual diagram illustrating an example network that includes a system for analyzing traffic flows across a network and/or within data center, in accordance with one or more aspects of the present disclosure. FIG. 1 illustrates one example implementation of a network system 100 and a data center 101 that hosts one or more computing networks, computing domains or projects, and/or cloud-based computing networks generally referred to herein as cloud computing cluster. The cloud-based computing clusters and may be co-located in a common overall computing environment, such as a single data center, or distributed across environments, such as across different data centers. Cloud-based computing clusters may, for example, be different cloud environments, such as various combinations of OpenStack cloud environments, Kubernetes cloud environments or other computing clusters, domains, networks and the like. Other implementations of network system 100 and data center 101 may be appropriate in other instances. Such implementations may include a subset of the components included in the example of FIG. 1 and/or may include additional components not shown in FIG. 1.

In the example of FIG. 1, data center 101 provides an operating environment for applications and services for customers 104 coupled to data center 101 by service provider network 106. Although functions and operations described in connection with network system 100 of FIG. 1 may be illustrated as being distributed across multiple devices in FIG. 1, in other examples, the features and techniques attributed to one or more devices in FIG. 1 may be performed internally, by local components of one or more of such devices. Similarly, one or more of such devices may include certain components and perform various techniques that may otherwise be attributed in the description herein to one or more other devices. Further, certain operations, techniques, features, and/or functions may be described in connection with FIG. 1 or otherwise as performed by specific components, devices, and/or modules. In other examples, such operations, techniques, features, and/or functions may be performed by other components, devices, or modules. Accordingly, some operations, techniques, features, and/or functions attributed to one or more components, devices, or modules may be attributed to other components, devices, and/or modules, even if not specifically described herein in such a manner.

Data center 101 hosts infrastructure equipment, such as networking and storage systems, redundant power supplies, and environmental controls. Service provider network 106 may be coupled to one or more networks administered by other providers, and may thus form part of a large-scale public network infrastructure, e.g., the Internet.

In some examples, data center 101 may represent one of many geographically distributed network data centers. As illustrated in the example of FIG. 1, data center 101 is a facility that provides network services for customers 104. Customers 104 may be collective entities such as enterprises and governments or individuals. For example, a network data center may host web services for several enterprises and end users. Other example services may include data storage, virtual private networks, traffic engineering, file service, data mining, scientific- or super-computing, and so on. In some examples, data center 101 is an individual network server, a network peer, or otherwise.

In the example of FIG. 1, data center 101 includes a set of storage systems, application servers, compute nodes, or other devices, including network device 110A through network device 110N (collectively "network devices 110," representing any number of network devices). Devices 110 may be interconnected via high-speed switch fabric 121 provided by one or more tiers of physical network switches and routers. In some examples, devices 110 may be included within fabric 121, but are shown separately for ease of illustration.

Network devices 110 may be any of a number of different types of network devices (core switches, spine network devices, leaf network devices, edge network devices, or other network devices), but in some examples, one or more devices 110 may serve as physical compute nodes of the data center. For example, one or more of devices 110 may provide an operating environment for execution of one or more customer-specific applications or services. Alternatively, or in addition, one or more of devices 110 may provide an operating environment for one or more virtual machines or other virtualized instances, such as containers. In some examples, one or more of devices 110 may be alternatively referred to as a host computing device or, more simply, as a host. A network device 110 may thereby execute one or more virtualized instances, such as virtual machines, containers, or other virtual execution environment for running one or more services, such as virtualized network functions (VNFs).

In general, each of network devices 110 may be any type of device that may operate on a network and which may generate data (e.g. connectivity data, flow data, sFlow data) accessible through telemetry or otherwise, which may include any type of computing device, sensor, camera, node, surveillance device, or other device. Further, some or all of network devices 110 may represent a component of another device, where such a component may generate data collectible through telemetry or otherwise. For example, some or all of network devices 110 may represent physical or virtual network devices, such as switches, routers, hubs, gateways, security devices such as firewalls, intrusion detection, and/or intrusion prevention devices.

Although not specifically shown, switch fabric 121 may include top-of-rack (TOR) switches coupled to a distribution layer of chassis switches, and data center 101 may include one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Switch fabric 121 may perform layer 3 routing to route network traffic between data center 101 and customers 104 by service provider network 106. Gateway 108 acts to forward and receive packets between switch fabric 121 and service provider network 106.

Software-Defined Networking ("SDN") controller 132 provides a logically and in some cases physically centralized controller for facilitating operation of one or more virtual networks within data center 101 in accordance with one or more examples of this disclosure. In some examples, SDN controller 132 operates in response to configuration input received from orchestration engine 130 via northbound application programming interface (API) 131, which in turn may operate in response to configuration input received from an administrator 128 interacting with and/or operating user interface device 129.

User interface device 129 may be implemented as any suitable device for presenting output and/or accepting user input. For instance, user interface device 129 may include a display. User interface device 129 may be a computing system, such as a mobile or non-mobile computing device operated by a user and/or by administrator 128. User interface device 129 may, for example, represent a workstation, a laptop or notebook computer, a desktop computer, a tablet computer, or any other computing device that may be operated by a user and/or present a user interface in accordance with one or more aspects of the present disclosure. In some examples, user interface device 129 may be physically separate from and/or in a different location than controller 201. In such examples, user interface device 129 may communicate with controller 201 over a network or other means of communication. In other examples, user interface device 129 may be a local peripheral of controller 201, or may be integrated into controller 201.

In some examples, orchestration engine 130 manages functions of data center 101 such as compute, storage, networking, and application resources. For example, orchestration engine 130 may create a virtual network for a tenant within data center 101 or across data centers. Orchestration engine 130 may attach virtual machines (VMs) to a tenant's virtual network. Orchestration engine 130 may connect a tenant's virtual network to an external network, e.g. the Internet or a VPN. Orchestration engine 130 may implement a security policy across a group of VMs or to the boundary of a tenant's network. Orchestration engine 130 may deploy a network service (e.g. a load balancer) in a tenant's virtual network.

In some examples, SDN controller 132 manages the network and networking services such load balancing, security, and may allocate resources from devices 110 that serve as host devices to various applications via southbound API 133. That is, southbound API 133 represents a set of communication protocols utilized by SDN controller 132 to make the actual state of the network equal to the desired state as specified by orchestration engine 130. For example, SDN controller 132 may implement high-level requests from orchestration engine 130 by configuring physical switches, e.g. top-of-rack (TOR) switches, chassis switches, and switch fabric 121; physical routers; physical service nodes such as firewalls and load balancers; and virtual services such as virtual firewalls in a VM. SDN controller 132 maintains routing, networking, and configuration information within a state database.

Network analysis system 140 interacts with or receives data from one or more of devices 110 (and/or other devices). Such data can include network connectivity data, network topology data, network address data, and network flow data across data center 101 and/or network system 100. Such flow data may include underlay flow data and overlay flow data. In some examples, the underlay flow data may be collected through samples of flow data collected at Layer 2 of the OSI model. Overlay flow data may be data (e.g., samples of data) derived from overlay traffic across one or more virtual networks established within network system 100. Overlay flow data may, for example, include information identifying a source virtual network and a destination virtual network.

Network analysis system 140 may receive and process a query. For instance, in the example being described, user interface device 129 detects input and outputs information about the input to network analysis system 140. Network analysis system 140 determines that the information corresponds to a request for information about network system 100 from a user of user interface device 129. Network analysis system 140 processes the request by querying stored information derived from network discovery interactions, such as those pursuant to LLDP. Network analysis system 140 generates a response to the query based on the stored data, and outputs information about the response to user interface device 129.

In order to facilitate collecting information about a network, which may include information about connectivity (MAC address, IP address, interface name, interface index) or overlay flow data with underlay flow data, and to respond to queries with accurate data, network analysis system 140 may use techniques described herein to determine connectivity data for devices 110. In some examples, connectivity data can be determined in the absence of LLDP or other layer 2 network discovery protocols. Network analysis system 140 can use the connectivity data to analyze aspects of the network (which may include underlay data flows), and to provide topological views of the network that include devices that may otherwise not be presented due to the lack of LLDP or other layer 2 network discovery protocols on the devices.

Figure 2:
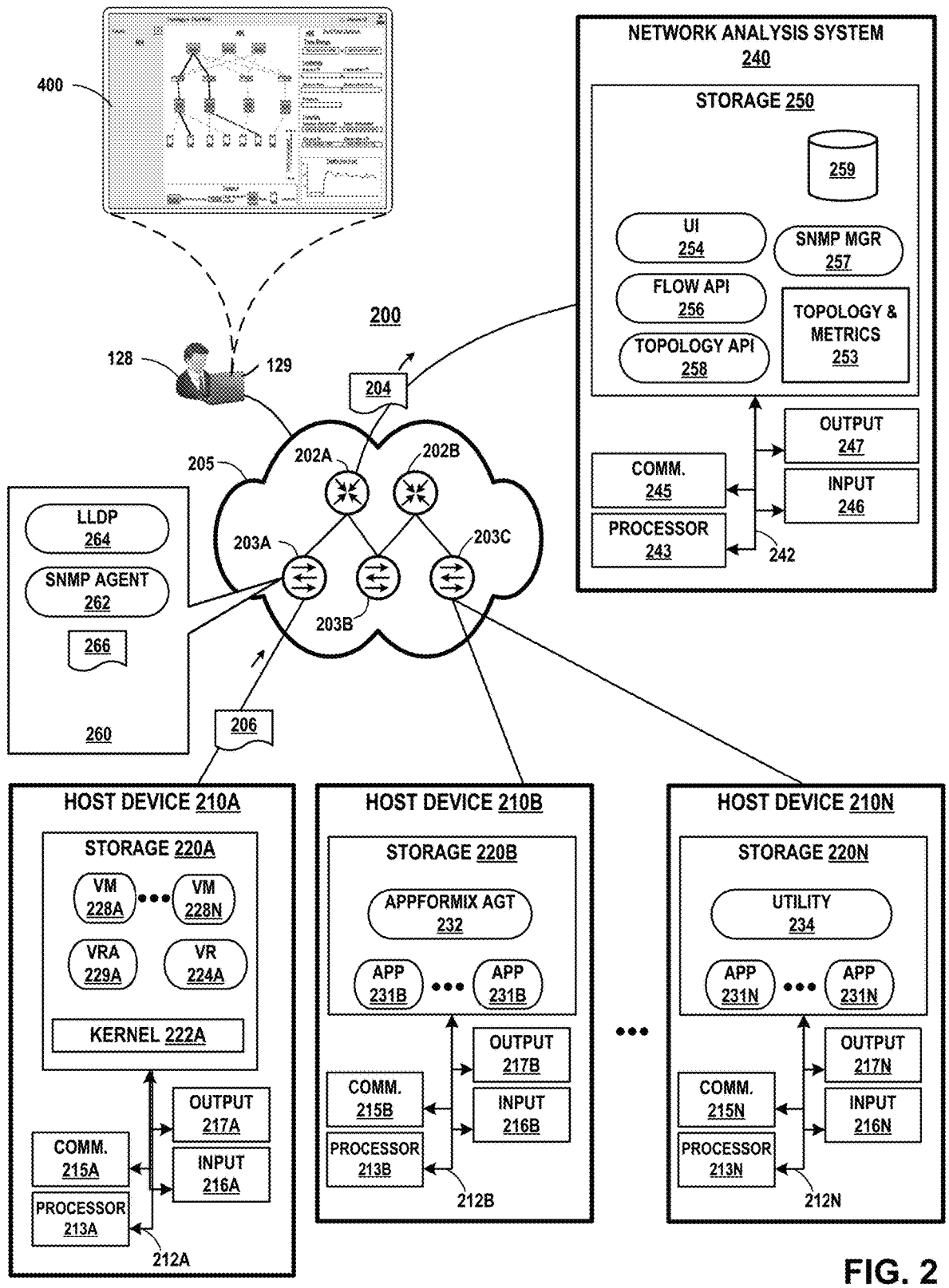
FIG. 2 is a block diagram illustrating an example network for analyzing device connectivity across a network and/or within data center, in accordance with one or more aspects of the present disclosure.

FIG. 2 is a block diagram illustrating an example network for analyzing device connectivity across a network and/or within data center, in accordance with one or more aspects of the present disclosure. Network system 200 of FIG. 2 may be described as an example or alternative implementation of network system 100 of FIG. 1. One or more aspects of FIG. 2 may be described herein within the context of FIG. 1.

Although a data center, such as that illustrated in FIG. 1 and FIG. 2 may be operated by any entity, some data centers are operated by a service provider, where the business model of such a service provider may involve providing computing capacity to customers or clients. For this reason, data centers usually contain a huge number of compute nodes, or host devices. In order to operate efficiently, those hosts have to be connected to each other and to the external world, and that ability is provided through physical network devices, which may be interconnected in a leaf-spine topology. The collection of these physical devices, such as network devices and hosts, form the underlay network.

Each host device in such a data center may have several virtual machines running on it, which may be referred to as workloads. Clients of the data center usually have access to these workloads, and can install applications and perform other operations using such workloads. Workloads that run on different host devices but are accessible by one particular client are organized into a virtual network. Each client usually has at least one virtual network. Those virtual networks are also called overlay networks. In some cases, a client of the data center may experience connectivity issues between two applications that are running on different workloads. Troubleshooting such issues tends to be complicated by the deployment of the workloads in a large multi-tenant data center. Trouble shooting such issues may be further complicated by a lack of connectivity data with respect to servers and other compute nodes that may host workloads.

In the example of FIG. 2, network 205 connects network analysis system 240, host device 210A, and host devices 210B-210N. Network analysis system 240 may correspond to an example or alternative implementation of network analysis system 140 illustrated in FIG. 1. Host devices 210A, 210B, through 210N may be collectively referenced as "host devices 210," representing any number of host devices 210.

Each of host devices 210 may be an example of devices 110 of FIG. 1, but in the example of FIG. 2, each of host devices 210 is implemented as a server or host device that operates as a physical or virtualized compute node of a virtualized data center, as opposed to a network device. As further described herein, one or more of host devices 210 (e.g., host device 210A of FIG. 2) may execute multiple virtual computing instances, such as virtual machines 228, and in addition, one or more of host devices 210 (e.g., one or more of host devices 210B through 210N) may execute applications or service modules 277 on a non-virtualized, single-tenant, and/or bare metal server. Accordingly, as in FIG. 1, the example of FIG. 2 illustrates a network system that may include a mix of virtualized server devices and bare metal server devices.

Also connected to network 205 is user interface device 129, which may be operated by administrator 128, as in FIG. 1. In some examples, user interface device 129 may present, at a display device associated with user interface device 129, one or more user interfaces, some of which may have a form similar to user interface 400.

Network 205 may correspond to any of switch fabric 121 and/or service provider network 106 of FIG. 1, or alternatively, may correspond to a combination of switch fabric 121, service provider network 106, and/or another network. Although not shown in FIG. 2, network 205 may also include some of the components of FIG. 1, including gateway 108, SDN controller 132, and orchestration engine 130.

Illustrated within network 205 are spine devices 202A and 202B (collectively "spine devices 202" and representing any number of spine devices 202), as well as leaf device 203A, 203B, and leaf device 203C (collectively "leaf devices 203" and also representing any number of leaf devices 203). Although network 205 is illustrated with spine devices 202 and leaf devices 203, other types of network devices may be included in network 205, including core switches, edge network devices, top-of-rack devices, and other network devices. Spine devices 202, leaf devices 203, core switches, edge network devices, top-of-rack devices, and other network devices may be generically referred to as bridge devices. In general, a bridge device may be any network device that operates at the data link layer (layer 2) to provide network communications to different networks or network segments.

In general, network 205 may be the internet, or may include or represent any public or private communications network or other network. For instance, network 205 may be a cellular, Wi-Fi®, ZigBee, Bluetooth, Near-Field Communication (NFC), satellite, enterprise, service provider, and/or other type of network enabling transfer of transmitting data between computing systems, servers, and computing devices. One or more of client devices, server devices, or other devices may transmit and receive data, commands, control signals, and/or other information across network 205 using any suitable communication techniques. Network 205 may include one or more network hubs, network switches, network routers, satellite dishes, or any other network equipment. Such devices or components may be operatively inter-coupled, thereby providing for the exchange of information between computers, devices, or other components (e.g., between one or more client devices or systems and one or more server devices or systems). Each of the devices or systems illustrated in FIG. 2 may be operatively coupled to network 205 using one or more network links. The links coupling such devices or systems to network 205 may be Ethernet, Asynchronous Transfer Mode (ATM) or other types of network connections, and such connections may be wireless and/or wired connections. One or more of the devices or systems illustrated in FIG. 2 or otherwise on network 205 may be in a remote location relative to one or more other illustrated devices or systems.

As shown in FIG. 2, leaf device 203A includes a network management environment 260. Network management environment 260 may include layer 2 discovery module(s) and network management functions. In some implementations, network management environment 260 may include a Link Layer Discovery Protocol (LLDP) module 264 and an SNMP agent 262. LLDP module 264 implements LLDP on leaf device 203A. LLDP is a standardized protocol used by network devices to advertise identification information, feature information and neighbor information for a network device such as leaf device 203A and to receive such information from other network devices and/or hosts on a network that implement LLDP.

SNMP agent 262 collects network management data about leaf device 203A and stores the collected data in one or more management information bases (MIBs) 266. In some examples, SNMP agent 262 can collect connectivity information and other information for network interfaces hosted on leaf device 203A. Such information can include a network address such as a MAC address of a remote device coupled to a network interface of leaf device 203A and text representing a name or label for the network interface. In some aspects, MIBs 266 can include a bridge data store such as a BRIDGE-MIB and a Q-BRIDGE-MIB. The content and format of BRIDGE-MIB is specified in Norseth, K., Ed., and E. Bell, Ed., "Definitions of Managed Objects for Bridges", RFC 4188, September 2005, which is hereby incorporated by reference. The content and format of Q-BRIDGE-MIB is specified in Levi, D. and D. Harrington, "Definitions of Managed Objects for Bridges with Traffic Classes, Multicast Filtering, and Virtual LAN Extensions", RFC 4363, January 2006, which is hereby incorporated by reference. A same or similar network management environment 260 may exist on other leaf devices 203 and spine devices 202.

Network analysis system 240 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, network analysis system 240 represents a cloud computing system, server farm, and/or server cluster (or portion thereof) that provides services to client devices and other devices or systems. In other examples, network analysis system 240 may represent or be implemented through one or more virtualized compute instances (e.g., virtual machines, containers) of a data center, cloud computing system, server farm, and/or server cluster.

In the example of FIG. 2, network analysis system 240 may include one or more processors 243, one or more communication units 245, one or more input devices 246, and one or more output devices 247. Storage devices 250 may include user interface module 254, flow API 256, SNMP manager 257, topology & metrics source 253, and data store 259.

One or more of the devices, modules, storage areas, or other components of network analysis system 240 may be interconnected to enable inter-component communications (physically, communicatively, and/or operatively). In some examples, such connectivity may be provided by through communication channels (e.g., communication channels 242), a system bus, a network connection, an inter-process communication data structure, or any other method for communicating data.

One or more processors 243 of network analysis system 240 may implement functionality and/or execute instructions associated with network analysis system 240 or associated with one or more modules illustrated herein and/or described herein. One or more processors 243 may be, may be part of, and/or may include processing circuitry that performs operations in accordance with one or more aspects of the present disclosure. Examples of processors 243 include microprocessors, application processors, display controllers, auxiliary processors, one or more sensor hubs, and any other hardware configured to function as a processor, a processing unit, or a processing device.

One or more communication units 245 of network analysis system 240 may communicate with devices external to network analysis system 240 by transmitting and/or receiving data, and may operate, in some respects, as both an input device and an output device. In some examples, communication unit 245 may communicate with other devices over a network. In other examples, communication units 245 may send and/or receive radio signals on a radio network such as a cellular radio network. Examples of communication units 245 include a network interface card (e.g. such as an Ethernet card), an optical transceiver, a radio frequency transceiver, a GPS receiver, or any other type of device that can send and/or receive information. Other examples of communication units 245 may include devices capable of communicating over Bluetooth®, GPS, NFC, ZigBee, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth, NFC, or other technologies or protocols.

One or more input devices 246 may represent any input devices of network analysis system 240 not otherwise separately described herein. One or more input devices 246 may generate, receive, and/or process input from any type of device capable of detecting input from a human or machine. For example, one or more input devices 246 may generate, receive, and/or process input in the form of electrical, physical, audio, image, and/or visual input (e.g., peripheral device, keyboard, microphone, camera).

One or more output devices 247 may represent any output devices of network analysis system 240 not otherwise separately described herein. One or more output devices 247 may generate, receive, and/or process input from any type of device capable of detecting input from a human or machine. For example, one or more output devices 247 may generate, receive, and/or process output in the form of electrical and/or physical output (e.g., peripheral device, actuator).

One or more storage devices 250 within network analysis system 240 may store information for processing during operation of network analysis system 240. Storage devices 250 may store program instructions and/or data associated with one or more of the modules described in accordance with one or more aspects of this disclosure. One or more processors 243 and one or more storage devices 250 may provide an operating environment or platform for such modules, which may be implemented as software, but may in some examples include any combination of hardware, firmware, and software. One or more processors 243 may execute instructions and one or more storage devices 250 may store instructions and/or data of one or more modules. The combination of processors 243 and storage devices 250 may retrieve, store, and/or execute the instructions and/or data of one or more applications, modules, or software. Processors 243 and/or storage devices 250 may also be operably coupled to one or more other software and/or hardware components, including, but not limited to, one or more of the components of network analysis system 240 and/or one or more devices or systems illustrated as being connected to network analysis system 240.

In some examples, one or more storage devices 250 are implemented through temporary memory, which may mean that a primary purpose of the one or more storage devices is not long-term storage. Storage devices 250 of network analysis system 240 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Storage devices 250, in some examples, also include one or more computer-readable storage media. Storage devices 250 may be configured to store larger amounts of information than volatile memory. Storage devices 250 may further be configured for long-term storage of information as non-volatile memory space and retain information after activate/off cycles. Examples of non-volatile memories include magnetic hard disks, optical discs, Flash memories, or forms of electrically programmable memories (EPROM) or electrically erasable and programmable (EEPROM) memories.

User interface module 254 may perform functions relating to generating user interfaces for presenting the results of analytical queries performed by flow API 256. In some examples, user interface module 254 may generate information sufficient to generate a set of user interfaces, and cause communication unit 215 to output such information over network 205 for use by user interface device 129 to present one or more user interfaces at a display device associated with user interface device 129.

Flow API 256 may perform analytical queries involving data stored in data store 259 that is derived from collection of underlay flow data 204 and overlay flow data 206. In some examples, flow API 256 may receive a request in the form of information derived from an HTTP POST request, and in response, may convert the request into a query to be executed on data store 259. Further, in some examples, flow API 256 may fetch topology information pertaining to the device 110 (FIG. 1), and perform analytics that include data deduplication, overlay-underlay correlation, traffic path identification, and heatmap traffic calculation.

SNMP manager 257 may communicate with SNMP agents 262 on network connected devices such as spine switches 202 and leaf switches 203. For example, SNMP manager 257 may get and set data values in MIBs maintained by an SNMP agent 262. SNMP manager 257 may also acknowledge and/or respond to events generated or received from SNMP agent 262.

Topology & metrics module 253 may maintain network topology information that may be used to enrich or augment flow data with topology information and/or metrics information. For example, topology & metrics module 253 may provide network topology metadata, which may include identified nodes or network devices, configuration information, configuration, established links, and other information about such nodes and/or network devices. In some examples, topology & metrics module 253 may use AppFormix topology data or may be an executing AppFormix module. Where such topology data is not available, for example, when a host device 210 does not implement LLDP or other layer 2 discovery protocol, topology & metrics module 253 may use techniques described herein to determine connectivity and/or topology information.

Data store 259 may represent any suitable data structure or storage medium for storing information related to data flow information and network topology information, including storage of data derived from underlay flow data 204, overlay flow data 206 and network connectivity and topology information. Data store 259 may be responsible for storing data in an indexed format, enabling fast data retrieval and execution of queries. The information stored in data store 259 may be searchable and/or categorized such that one or more modules within network analysis system 240 may provide an input requesting information from data store 259, and in response to the input, receive information stored within data store 259. Data store 259 may be maintained by either or both SNMP manager 257 and topology & metrics module 253. Data store 259 may be implemented through multiple hardware devices, and may achieve fault tolerance and high availability by sharding and replicating data.

Each of host devices 210 represents a physical computing device or compute node that provides an execution environment for virtual hosts, virtual machines, containers, and/or other virtualized computing resources. In some examples, each of host devices 210 may be a component of a cloud computing system, server farm, and/or server cluster (or portion thereof) that provides services to client devices and other devices or systems.

Certain aspects of host devices 210 are described herein with respect to host device 210A. Other host devices 210 (e.g., host device 210B through 210N) may be described similarly, and may also include like-numbered components that may represent the same, similar, or corresponding components, devices, modules, functionality, and/or other features. Descriptions herein with respect to host device 210A may therefore correspondingly apply to one or more other host devices 210 (e.g., host device 210B through host device 210N).

In the example of FIG. 2, host device 210A includes underlying physical compute hardware that includes one or more processors 213A, one or more communication units 215A, one or more input devices 216A, one or more output devices 217A, and one or more storage devices 220A. In the example shown, storage devices 220A may include kernel module 222, and virtual router module 224. Virtual machines 228A through 228N (collectively "virtual machines 228" and representing any number of virtual machines 228), when present, may execute on top of a hypervisor (not shown) or may be controlled by a hypervisor. Similarly, virtual router agent 229A may execute on, or under the control of, a hypervisor. One or more of the devices, modules, storage areas, or other components of host device 210A may be interconnected to enable inter-component communications (physically, communicatively, and/or operatively). In some examples, such connectivity may be provided by through communication channels (e.g., communication channels 212A), a system bus, a network connection, an inter-process communication data structure, or any other method for communicating data.

Processor 213A may implement functionality and/or execute instructions associated with host device 210A. Communication unit 215A may communicate with other devices or systems on behalf of host device 210A. One or more input devices 216A and output devices 217A may represent input and/or output devices associated with host device 210A. Storage devices 220A may store information for processing during operation of host device 210A. Each of such components may be implemented in a manner similar to those described herein in connection with network analysis system 240 or otherwise.

Virtual router module 224A may execute multiple routing instances for corresponding virtual networks within data center 101 (see FIG. 1) and may route packets to appropriate virtual machines executing within the operating environment provided by host device 110A. Virtual router module 224A may also be responsible for collecting overlay flow data, such as Contrail Flow data when used in an infrastructure in which the Contrail SDN is employed. Accordingly, one or more of host devices 210 may include a virtual router.

Virtual machine 228A through virtual machine 228N (collectively "virtual machines 228," representing any number of virtual machines 228) may represent example instances of virtual machines 228. Host device 210A may partition the virtual and/or physical address space provided by storage device 220A into user space for running user processes. Host device 210A may also partition virtual and/or physical address space provided by storage device 220A into kernel space, which is protected and may be inaccessible by user processes.

Each of virtual machines 228 may represent a tenant virtual machine running customer applications such as Web servers, database servers, enterprise applications, or hosting virtualized services used to create service chains. In some cases, any one or more of host devices 210 or another computing device hosts customer applications directly, i.e., not as virtual machines (e.g., one or more of host devices 210B through 210N, such as host device 210B and host device 210N). Although one or more aspects of the present disclosure are described in terms of virtual machines or virtual hosts, techniques in accordance with one or more aspects of the present disclosure that are described herein with respect to such virtual machines or virtual hosts may also apply to containers, applications, processes, or other units of execution (virtualized or non-virtualized) executing on host devices 210.

Virtual router agent 229A is included within host device 210A in the example of FIG. 2 and may communicate with SDN controller 132 (see FIG. 1) and virtual router module 224A so as to control the overlay of virtual networks and coordinate the routing of data packets within host device 210A. In general, virtual router agent 229A communicates with SDN controller 132, which generates commands to control routing of packets through data center 101. Virtual router agent 229A may execute in user space and operate as a proxy for control plane messages between virtual machines 228 and SDN controller 132. For example, virtual machine 228A may request to send a message using its virtual address via virtual router agent 229A, and virtual router agent 229A may in turn send the message and request that a response to the message be received for the virtual address of virtual machine 228A, which originated the first message. In some cases, virtual machine 228A may invoke a procedure or function call presented by an application programming interface of virtual router agent 229A, and in such an example, virtual router agent 229A handles encapsulation of the message as well, including addressing.

In the example of FIG. 2, host device 210B includes, like host device 210A, underlying physical compute hardware that includes one or more processors 213B, one or more communication units 215B, one or more input devices 216B, one or more output devices 217B, and one or more storage devices 220B. Storage devices 220B may include one or more application modules 231B, which may correspond to applications executing by or on behalf of one or more tenants of host device 210B. In the example of FIG. 2, host device 210B may be a bare metal server, which may mean that host device 210B executes as a single tenant device without virtualized components as in, for example, host device 210A. In such an example, host device 210B might not include any component or module that corresponds to virtual router module 224A, and/or virtual router agent 229A of host device 210A. Similarly, host device 210N might not include any component or module that corresponds to virtual router module 224A, and/or virtual router agent 229A of host device 210A.

Additionally, while many host devices 210 may include a network layer 2 discover protocol such as LLDP enabling the host device to advertise information regarding its network connectivity, some host devices 210 might not include such capability. For example, operators of some of host devices 210 may desire to maintain strict control over the operating environment of the host devices, and strict control over applications running on a host device such as applications 231B and 231N. As an example, a host device 210 may be a security related device where it is desirable to limit applications and other software to those that have been inspected and approved by the host device 210 operator. As such, the operator of a host device 210 might choose to not incorporate and/or install LLDP or other network discovery software on a host 210. In the example illustrated in FIG. 2, host devices 210A, 210B and 210N do not include software implementing LLDP or other network layer 2 discovery protocols. As a result, topology & metrics module 253 might not be able to rely on LLDP or other network layer 2 protocol to discover information regarding connectivity to host devices 210A, 210B and 210N. In such cases, network analysis system 240 may use techniques described herein to obtain connectivity information for host devices 210A, 210B and 210N.

In some aspects, network analysis system 240 may issue SNMP commands to an SNMP agent 262 executing on a leaf device 203A to obtain connectivity information regarding the network interfaces present on leaf device 203A. Network analysis system 240 can correlate information with other information obtained by network analysis system 240 to determine which devices are connected to leaf device 203A, even when such devices may not implement LLDP or other network layer 2 discovery protocol.

Figure 3:
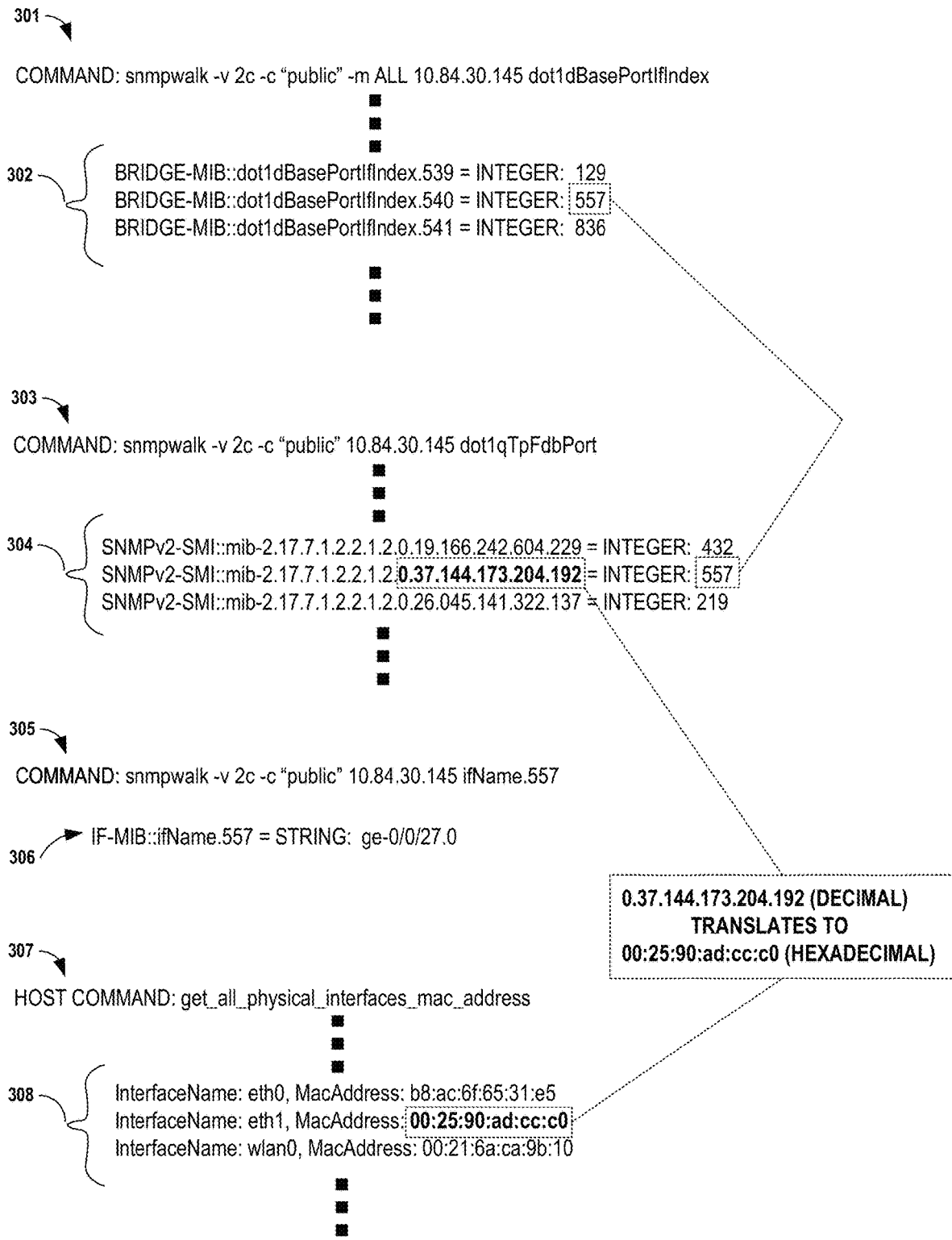
FIG. 3 is a conceptual diagram illustrating example queries executing on network device databases, in accordance with one or more aspects of the present disclosure.

FIG. 3 illustrates the format of such SNMP commands and example data returned in response to execution of the corresponding command. FIG. 3 will be discussed in conjunction with FIG. 2. In the example illustrated in FIG. 2, LLDP module 264 of leaf device 203A may obtain connectivity data on some, but not all, of the network interfaces on leaf device 203A. In order to obtain connectivity data on network interfaces for which LLDP module 264 could not be used, network analysis system 240 may issue "snmpwalk" commands to query MIBs 266 on leaf device 203A, and use the data returned in responses to the commands to determine more complete connectivity information for leaf device 203A. The snmpwalk command issues one or more SNMP get and/or get-next primitives to obtain data from MIBs 266.

For example, network analysis system 240 may issue SNMP command 301, which is as follows:
    snmpwalk -v 2c -c "public"-m ALL 10.84.30.145 dot1dBasePortIfIndex
where:
    -v 2c specifies a version of SNMP,
    -c "public" specifies a community name,
    -m ALL specifies all MIB files on the device are to be queried,
    10.84.30.145 specifies the IP address of the device (in this example, leaf device 203A) to be queried, and
    dot1dBasePortIfIndex specifies the SNMP Object Identifier (OID) to be queried. dot1dBasePortIfIndex is an SNMP object that has data for each port of a switch identifying an ifIndex for the port corresponding to the entry.

Command output 302 is a series of MIB records each specifying an interface index for the record. In the example illustrated in FIGS. 2 and 3, the ifIndex value for the port having port index 540 in the MIB is the integer value 557.

Network analysis system 240 may issue SNMP command 303, which is as follows:
    snmpwalk -v 2c -c "public" 10.84.30.145 dot1qTpFdbPort
where:
    -v 2c specifies a version of SNMP,
    -c "public" specifies a community name,
    10.84.30.145 specifies the IP address of the device (i.e., leaf device 203A) to be queried, and
    dot1qTpFdbPort specifies the SNMP Object Identifier (OID) to be queried.
The dot1qTpFdbPort is an SNMP object maps the Layer2 MAC address learned by a switch to a physical port on the switch.

Command output 304 is a series of MIB records each specifying a remote MAC address and an interface index for the record. The remote MAC address is the MAC address of a device coupled to the switch at the switch port having the given ifIndex. A MAC address may be referred to as a hardware address or physical address, and is a unique identifier for a network interface for a network device. In the example illustrated in FIGS. 2 and 3, the MAC address corresponding to ifIndex 557 is "0.37.144.173.204.192" (when expressed as decimal numerals). Correlating the output of command 301 with the output of command 303, network analysis system 240 determines that the port of leaf device 203A having a port index of 540 has an ifIndex value of 557. The remote MAC address for the port is "0.37.144.173.204.192." MAC addresses are commonly expressed using hexadecimal numerals, thus "0.37.144.173.204.192" becomes "00:25:90:ad:cc:c0" in hexadecimal.

Network analysis system 240 may issue SNMP command 305, which is as follows:
    snmpwalk -v 2c -c "public" 10.84.30.145 ifName.557
where:
    -v 2c specifies a version of SNMP, -c "public" specifies a community name,
10.84.30.145 specifies the IP address of the device (i.e., leaf device 203A) to be queried, and
ifName.557 specifies the SNMP Object Identifier (OID) to be queried.

The ifName object is an SNMP object maps an interface index to an interface name.

Command output 306 is a record that provides a text string containing the interface name associated with the interface index. In the example illustrated in FIGS. 2 and 3, the interface name for the port having an ifIndex of 557 is "ge-0/0/27.0."

After commands 301, 303 and 305 have been issued and the responses to the commands received, network analysis system 240 can determine that the port of leaf device 203 having a port index of 540 and a port name of ge-0/0/27.0 is connected to a device having a MAC address of 00:25:90:ad:cc:c0. A MAC address is typically used by layer 2 of the network protocol stack to uniquely identify a network interface. However, network operators typically find IP addresses and/or host names easier to work with when specifying network devices. Thus, in some aspects, network analysis system 240 may correlate the MAC address with an IP address and/or a host name.

Network analysis system 240 may correlate a MAC address with an IP address and/or host name in various ways. In the case of devices that implement LLDP, network analysis system 240 can obtain the MAC address, IP address, and host name for the device by querying a "Physical Topology" MIB using SNMP. In the case of devices that do not implement LLDP (e.g., host devices 210, 210B and 210C), network analysis system 240 may use other techniques. For example, as discussed above, host device 210 executes one or more virtual routers 224A. A virtual router typically maintains MAC address to IP address mappings, which may be obtained by network analysis system 240.

Additionally, network analysis system 240 may obtain MAC address to IP address mappings from a cloud service agent. In the example illustrated in FIG. 2, host 210B executes an AppFormix agent 232. AppFormix agent 232 can maintain a MAC address to IP address mapping for host 210B.

Further, network analysis system 240 may obtain MAC address to IP address mappings from a network administration utility 234. For example, host 210N can execute an "ifconfig" command. When executed, the ifconfig command produces output containing the MAC address, IP address, and host name for one or more interfaces on host device 210N. Network analysis system 240 can parse the output of ifconfig command and use the parsed output to create a mapping between a MAC address and the IP address and host name associated with the MAC address. Other network administration utilities such as the "netstat" command and "ip" command can provide similar information.

In some examples, utility 234 can be a custom utility that can obtain MAC address to IP address or host name mappings when executed on a host device. An example of executable code for such a utility 234 is illustrated in FIG. 6. The utility 234 code in the example illustrated in FIG. 6 is written in the Python programming language, and is used to illustrate execution logic of a utility 234 program to provide MAC address to IP address mappings. Other programming languages could be used to perform similar program logic to obtain such mappings. In this example, the utility 234 can obtain a list of network interfaces on the host device executing the utility, and then obtain a physical address (MAC address) for each interface in the list. In the example illustrated in FIG. 6, the utility 234 executes in a host device running a version of the Linux operating system, and obtains physical interface names from/sys/class/net/*/device and MAC addresses from/sys/class/net/<interface-_name>/address.

In the example illustrated in FIG. 3, the utility may be invoked as a command 307. Example utility output 308 comprises a listing of interfaces on the host that executed the utility along with MAC address corresponding to each interface on the host. As can be seen in FIG. 3, the interface labeled "eth1" has a MAC address that matches the remote MAC address for the dot1qTpFdbPort entry having an interface index of 557. Thus, the host device executing the utility is connected as a remote device to the bridge device having an interface index of 557.

As discussed above, network analysis system 240 may store underlay flow data 204 and overlay flow data 206 in data store 259 and use such data to analyze network traffic between various devices, both physical and virtual, in a network. The device connectivity information determined as discussed above can improve the analysis of such information by providing more complete connectivity data for devices in a network that do not implement LLDP or other layer 2 discovery protocol.

Further, network analysis system 240 may respond to queries by one or more likely paths of traffic associated with the queried virtual network. For example, user interface module 254 uses the information from flow API 256 to generate data sufficient to create a user interface presenting information about likely paths of traffic associate with the queried virtual network. User interface module 254 can use device connectivity information determined as discussed above to include devices that do not implement LLDP in the presentation of likely paths of network traffic.

For ease of illustration, only a limited number of devices (e.g., user interface devices 129, spine devices 202, leaf devices 203, host devices 210, network analysis system 240, as well as others) are shown within the Figures and/or in other illustrations referenced herein. However, techniques in accordance with one or more aspects of the present disclosure may be performed with many more of such systems, components, devices, modules, and/or other items, and collective references to such systems, components, devices, modules, and/or other items may represent any number of such systems, components, devices, modules, and/or other items.

Modules illustrated in FIG. 2 (e.g., virtual router modules 224, virtual machines 228, application modules 231, user interface module 254, SNMP manager 257, topology & metrics 253, and others) and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated.

Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

Figure 4A:
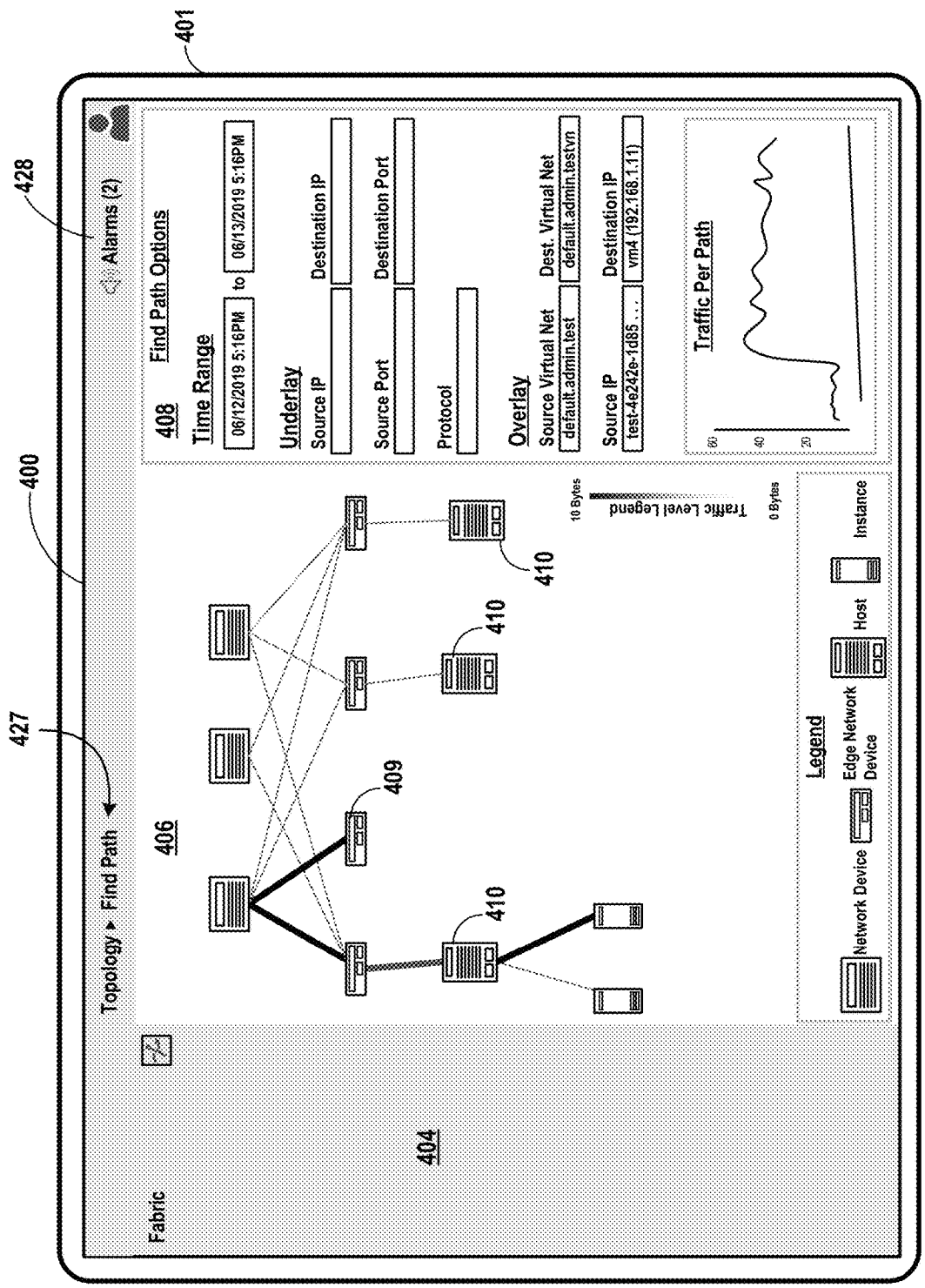
FIGS. 4A and 4B are conceptual diagrams illustrating an example user interface presented by a user interface device in accordance with one or more aspects of the present disclosure.

FIG. 4A is a conceptual diagram illustrating an example user interface presented by a user interface device in accordance with one or more aspects of the present disclosure. FIG. 4A illustrates example user interface 400. Although example user interface 400 is shown as graphical user interface, other types of interfaces may be presented in other examples, including a text-based user interface, a console or command-based user interface, a voice prompt user interface, or any other appropriate user interface. User interface 400 as illustrated in FIG. 4 may correspond to a user interface generated by user interface module 254 of network analysis system 240 and presented at user interface device 129 of FIG. 2. One or more aspects relating to the generation and/or presentation of user interface 400 may be described herein within the context of FIG. 2. The example illustrated in FIG. 4A, shows an example user interface 400 in which device connectivity information is not available for devices that do not implement a network layer 2 discovery protocol such as LLDP.

In accordance with one or more aspects of the present disclosure, network analysis system 240 may perform a query to identify a path through a physical or virtual network. For instance, in an example that can be described with reference to FIG. 2, user interface device 129 detects input and outputs a signal over network 205. Communication unit 245 of network analysis system 240 detects a signal that flow API 256 determines corresponds to a query for network information. Flow API 256 performs the query (e.g., using techniques described in connection with FIG. 3) and outputs information about the results to user interface module 254.

Network analysis system 240 may generate a user interface, such as user interface 400, for presentation at a display device. For instance, still referring to FIG. 2 and FIG. 4A, user interface module 254 generates information underlying user interface 400 and causes communication unit 245 to output a signal over network 205. User interface device 129 detects a signal and determines that the signal includes information sufficient to present a user interface. User interface device 129 presents example user interface 400 at a display device associated with user interface device 129 in the manner illustrated in FIG. 4.

In FIG. 4A, example user interface 400 is presented within display window 401. User interface 400 includes sidebar region 404, main display region 406, and options region 408. Sidebar region 404 provides an indication of which user interface mode is being presented within user interface 400, which in the example of FIG. 4, corresponds to a "Fabric" mode. Other modes may be available as appropriate for other network analysis scenarios. Along the top of main display region 406 is navigation interface component 427, which may also be used to select a type or mode of network analysis to be performed. Status notification display element 428 may provide information about alarms or other status information relating to one or more networks, users, elements, or resources.

Main display region 406 presents a network diagram and may provide a topology of various network devices included within the network being analyzed. In the example shown in FIG. 4A, the network is illustrated with spine devices, leaf devices, hosts, and instances, as indicated in the "Legend" shown along the bottom of main display region 406. Actual or potential data paths between the network devices and other components are illustrated within main display region 406. Although a limited number of different types of network devices and components are shown in FIG. 4, in other examples, other types of devices or components or elements could be presented and/or specifically illustrated, including core switch devices, other spine and leaf devices, physical or virtual routers, virtual machines, containers, and/or other devices, components, or elements. Further, some data paths or components of the network (e.g., instances) may be hidden or minimized within user interface 400 to facilitate illustration and/or presentation of components or data paths that are most relevant to a given network analysis.

In the example illustrated in FIG. 4A, devices that do not implement LLDP or other layer 2 discovery protocol are not shown. For example, the leaf device represented by icon 409 may be connected to host devices that do not implement LLDP. As a result, network analysis system 240 might not be able to display such devices without using the techniques described herein. Thus, as shown in FIG. 4A, there are no host devices shown as being connected to leaf device 409 in the topology illustrated in the main display region 406. Icons 410 represent host devices that do implement LLDP and are thus shown as being connected to their respective leaf devices.

Options region 408 provides, along the right-hand side of user interface 400, a number of input fields relating to both the underlay network being analyzed (e.g., underlay five-tuple input fields) as well as the overlay network being analyzed (e.g., source and destination virtual network and IP address input fields). User interface 400 accepts input through user interaction with one or more of the displayed input fields, and based on the data entered into the input fields, user interface module 254 presents responsive information about the network being analyzed.

For example, using the input that has been provided in options region 408, network analysis system 240 determines information about one or more possible data paths (e.g., the most likely data paths) through underlay network devices. Network analysis system 240 determines such possible data paths based on the data collected by network analysis system 240 during a time range specified in options region 408. User interface module 254 of network analysis system 240 generates data enabling the presentation of user interface 400, where possible data paths are highlighted (by drawing each segment of the data path with a wide line) as shown in FIG. 4A.

Figure 4B:
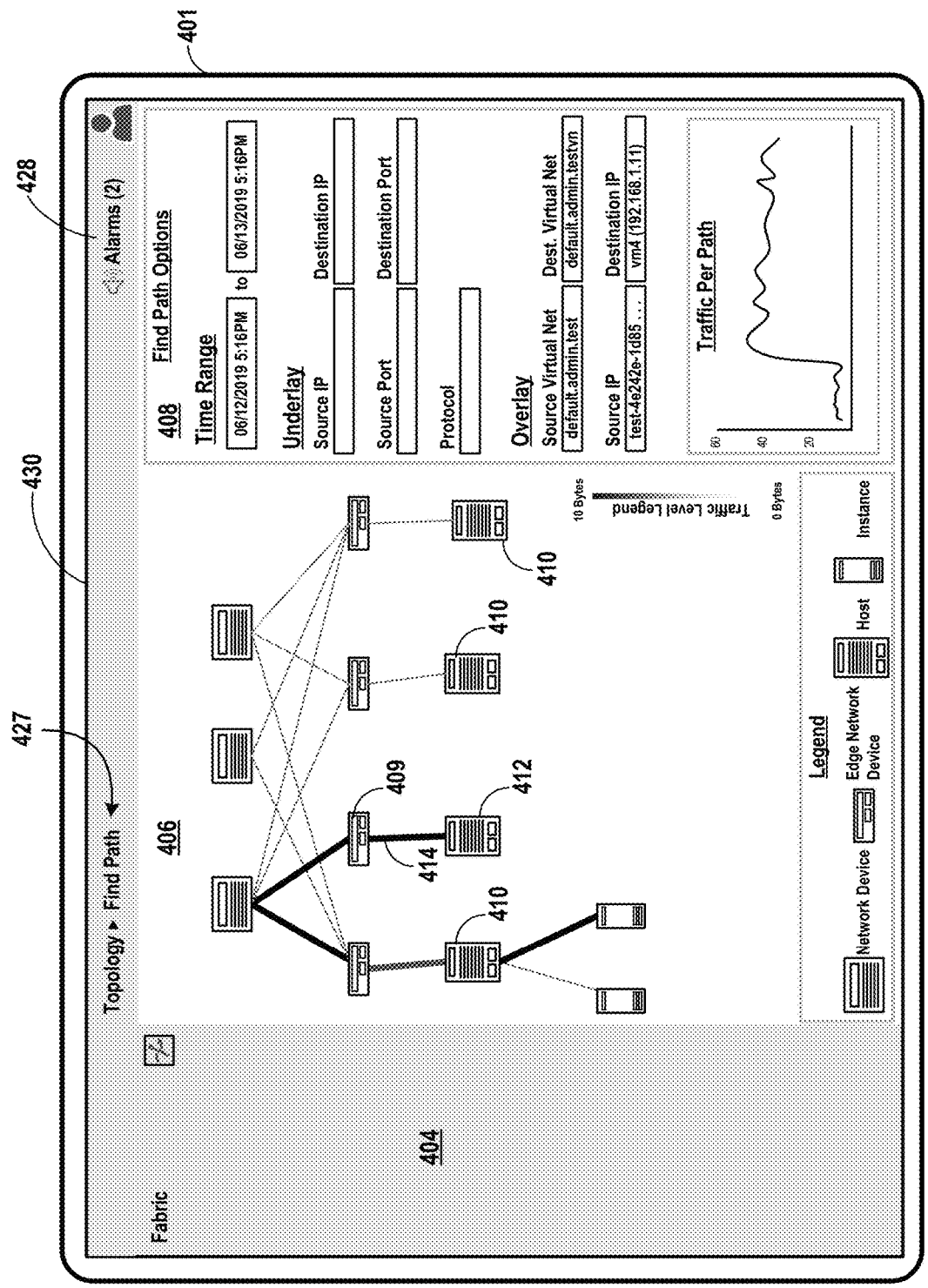

FIG. 4B is a conceptual diagram illustrating another example user interface presented by a user interface device in accordance with one or more aspects of the present disclosure. FIG. 4A illustrates example user interface 430. Example user interface 430 includes the same regions as those described above with respect to FIG. 4A. In the example illustrated in FIG. 4B, network analysis system 240 may use the techniques described herein to determine device connectivity information for devices that do not implement LLDP or other layer 2 discovery protocol. For example, the host device represented by icon 412 might not implement LLDP or other layer 2 discovery protocol. Using the techniques described herein, network analysis system 240 may use information stored in data store 259, for example, from previous queries of the leaf device represented by icon 409, or may query the leaf device represented by icon 409 and determine that the host device represented by icon 412 is in fact connected to the leaf device represented by icon 409 as indicated by communication link 414.

Figure 5:
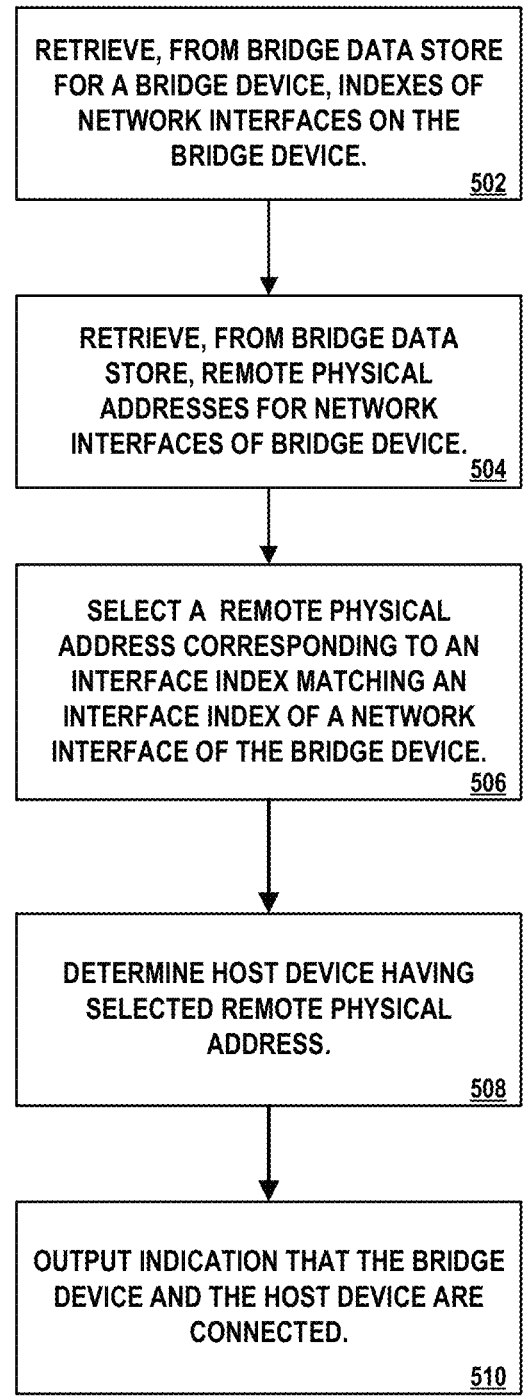
FIG. 5 is a flow diagram illustrating operations performed by an example network analysis system in accordance with one or more aspects of the present disclosure.

FIG. 5 is a flow diagram illustrating operations performed by an example network analysis system in accordance with one or more aspects of the present disclosure. FIG. 5 is described herein within the context of network analysis system 240 of FIG. 2. In other examples, operations described in FIG. 5 may be performed by one or more other components, modules, systems, or devices. Further, in other examples, operations described in connection with FIG. 5 may be merged, performed in a difference sequence, omitted, or may encompass additional operations not specifically illustrated or described.

The techniques described in FIG. 5 may be used to enable determination of connectivity between a bridge device and a remote host device when the bridge device and the host device do not implement the same layer 2 network discovery protocol. For example, a bridge device may implement LLDP, while a host device communicatively coupled to the bridge device may implement a different discovery protocol (e.g., a proprietary discovery protocol) or may not implement any discovery protocol at all.

In the process illustrated in FIG. 5, and in accordance with one or more aspects of the present disclosure, network analysis system 240 may retrieve, from a bridge data store of a bridge on a network 205, indexes of interfaces for a bridge device such as a switch, router, gateway etc. (502). In some aspects, the network analysis system 240 may issue an snmpwalk command to cause an SNMP agent on a leaf device (e.g., a TOR switch) to provide data from dot1dBasePortIfIndex objects in a BRIDGE-MIB data store. The data may include an interface index.

Network analysis system 240 may retrieve, from a bridge data store of the bridge, remote MAC addresses (i.e., physical addresses) for devices communicatively coupled to the interfaces of the bridge device (504). For example, network analysis system may obtain data from dot1qTpFdbAddress objects in a Q-BRIDGE-MIB data store. The information may include an interface index for each network interface of the bridge and a unicast MAC address for a remote host communicatively coupled to network interface for which the device has forwarding and/or filtering information.

Network analysis system 240 can select a remote MAC address associated with an interface based on the interface index (506). For example, network analysis system can select an interface index from a dot1dBasePortIfIndex object and select the remote MAC address from a dot1qTpFdbAddress corresponding to the matching interface index.

Network analysis system 240 can determine a host device having the selected remote MAC address (508). For example, network analysis system may obtain MAC address to IP address mappings using LLDP, AppFormix agents, virtual router information, or the output of network administration utilities executed by a remote host device. Network analysis system 240 can use the MAC address to IP address mapping to determine the IP address of the remote host device. The host name of the remote host device may be obtained in a similar manner.

Network analysis system 240 can output an indication that the bridge device is communicatively coupled to the remote host device (510). In some aspects, outputting the indication can include storing data in a data store that associates the remote host device with a network interface of the bridge device. In some aspects, outputting the indication can include providing a visual representation of the connectivity of the bridge device and host device on a user interface on a user interface device 129.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The Figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in a number of different ways. For instance, one or more devices illustrated in the Figures herein (e.g., FIG. 1 and/or FIG. 2) as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various Figures herein may alternatively be implemented as part of another device or component not shown in such Figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

Although specific advantages have been identified in connection with descriptions of some examples, various other examples may include some, none, or all of the enumerated advantages. Other advantages, technical or otherwise, may become apparent to one of ordinary skill in the art from the present disclosure. Further, although specific examples have been disclosed herein, aspects of this disclosure may be implemented using any number of techniques, whether currently known or not, and accordingly, the present disclosure is not limited to the examples specifically described and/or illustrated in this disclosure.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A method comprising:
retrieving, by a network analysis system from a bridge data store of a bridge device on a network having one or more host devices, a plurality of first interface indexes, wherein each first interface index of the plurality of first interface indexes corresponds to a network interface of a plurality of network interfaces of the bridge device;
retrieving, from the bridge data store, a plurality of remote Media Access Control (MAC) addresses corresponding to the plurality of network interfaces of the bridge device, each remote MAC address of the plurality of remote MAC addresses corresponding to one of a plurality of second interface indexes;
identifying the remote MAC address corresponding to a second interface index that matches the first interface index of the network interface of the bridge device;
determining a host device having the identified remote MAC address; and
outputting an indication that the bridge device is communicatively coupled to the host device.

2. The method of claim 1, wherein the bridge device implements a layer 2 discovery protocol and the host device does not implement the same layer 2 discovery protocol.

3. The method of claim 2, wherein the layer 2 discovery protocol comprises Link Layer Discovery Protocol (LLDP).

4. The method of claim 1, further comprising:
retrieving, from a network data store, an interface identifier for the network interface of the bridge device based, at least in part, on the first interface index;
wherein outputting the indication that the bridge device is communicatively coupled to the host device comprises storing, in a data store, network connectivity data including the interface identifier, the remote MAC address, and an identifier of the host device.

5. The method of claim 1, wherein outputting the indication that the bridge device is communicatively coupled to the host device comprises generating, by the network analysis system, data for a user interface that includes a visual indicator of connectivity between the bridge device and the host device, wherein the bridge device implements a layer 2 discovery protocol and the host device does not implement the layer 2 discovery protocol.

6. The method of claim 1, wherein the bridge data store comprises a BRIDGE-MIB and wherein retrieving the plurality of first interface indexes comprises issuing an snmpwalk command specifying a dot1dBasePortIfIndex object identifier.

7. The method of claim 1, wherein the bridge data store comprises a Q-BRIDGE-MIB and wherein retrieving the plurality of remote MAC addresses comprises issuing an snmpwalk command specifying a dot1qTpFdbPort object identifier.

8. The method of claim 1, further comprising:
obtaining, from the host device, a host device MAC address;
wherein determining the host device having the identified remote MAC address comprises determining the host device MAC address matches the identified remote MAC address.

9. The method of claim 8, wherein obtaining the host device MAC address comprises:
issuing an ipconfig command to the host device; and
parsing output of the ipconfig command to determine the host device MAC address.

10. A system including processing circuitry configured to perform operations to cause a network analysis system to:
retrieve, from a bridge data store of a bridge device on a network having one or more host devices, a plurality of first interface indexes, wherein each first interface index of the plurality of first interface indexes corresponds to a network interface of a plurality of network interfaces of the bridge device;
retrieve, from the bridge data store, a plurality of remote MAC addresses corresponding to the plurality of network interfaces of the bridge device, each remote MAC address of the plurality of remote MAC addresses corresponding to one of a plurality of second interface indexes;
identify the remote MAC address having a second interface index that matches the first interface index of the network interface of the bridge device;
determine a host device having the identified remote MAC address; and
output an indication that the bridge device is communicatively coupled to the host device.

11. The system of claim 10, wherein the bridge device implements a layer 2 discovery protocol and the host device does not implement the same layer 2 discovery protocol.

12. The system of claim 11, wherein the layer 2 discovery protocol comprises Link Layer Discovery Protocol (LLDP).

13. The system of claim 11, wherein the bridge data store comprises a BRIDGE-MIB and wherein the operations further comprise issuing an snmpwalk command specifying a dot1dBasePortIfIndex object identifier.

14. The system of claim 11, wherein the bridge data store comprises a Q-BRIDGE-MIB and wherein the operations further comprise issuing an snmpwalk command specifying a dot1qTpFdbPort object identifier.

15. The system of claim 11, wherein the operations further cause the network analysis system to:
obtain, from the host device, a host device MAC address; and
determine that the host device MAC address matches the identified remote MAC address.

16. The system of claim 15, wherein the operations further cause the network analysis system to:
issue a utility command to the host device; and
parse an output of the utility command to determine the host device MAC address.

17. The system of claim 10, wherein the operations further cause the network analysis system to:
retrieve, from a network data store, an interface identifier for the network interface of the bridge device based, at least in part, on the first interface index; and
store, in a data store, network connectivity data including the interface identifier, the remote MAC address, and an identifier of the host device.

18. The system of claim 10, wherein the operations further cause the network analysis system to:
generate, by the network analysis system, data for a user interface that includes a visual indicator of connectivity between the bridge device and the host device, wherein the bridge device implements a layer 2 discovery protocol and the host device does not implement the layer 2 discovery protocol.

19. A non-transitory computer-readable storage medium comprising instructions that, when executed, cause processing circuitry of a computing system to:
retrieve, from a bridge data store of a bridge device on a network having one or more host devices, a plurality of first interface indexes, wherein each first interface index of the plurality of first interface indexes corresponds to a network interface of a plurality of network interfaces of the bridge device;
retrieve, from the bridge data store, a plurality of remote MAC addresses corresponding to the plurality of network interfaces of the bridge device, each remote MAC address of the plurality of remote MAC addresses corresponding to one of a plurality of second interface indexes;
identify the remote MAC address having a second interface index that matches the first interface index of the network interface of the bridge device;
determine a host device having the identified remote MAC address; and
output an indication that the bridge device is communicatively coupled to the host device.

20. The non-transitory computer-readable storage medium of claim 19, wherein the bridge device implements a layer 2 discovery protocol and the host device does not implement the same layer 2 discovery protocol.

* * * * *